(No Model.)  2 Sheets—Sheet 1.

T. C. COYKENDALL.
MEANS FOR VENTILATING ARMATURES.

No. 523,161.  Patented July 17, 1894.

WITNESSES:

INVENTOR
Thomas C. Coykendall,
BY Briesen & Knauth
ATTORNEYS.

(No Model.)  2 Sheets—Sheet 2.
T. C. COYKENDALL.
MEANS FOR VENTILATING ARMATURES.
No. 523,161. Patented July 17, 1894.
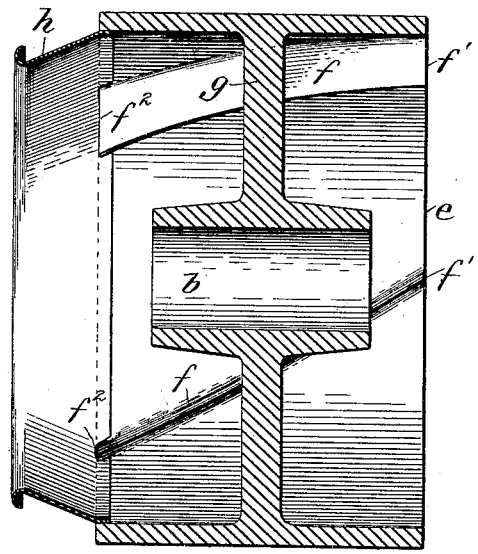
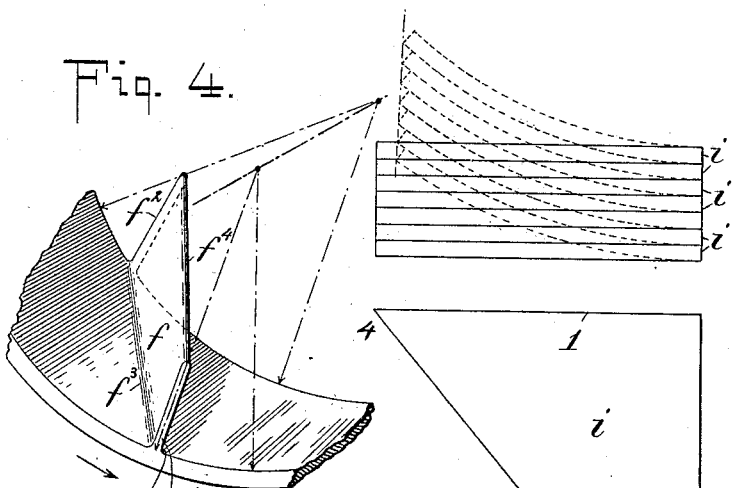

UNITED STATES PATENT OFFICE.

THOMAS C. COYKENDALL, OF RONDOUT, NEW YORK.

MEANS FOR VENTILATING ARMATURES.

SPECIFICATION forming part of Letters Patent No. 523,161, dated July 17, 1894.

Application filed October 17, 1893. Serial No. 488,394. (No model.)

*To all whom it may concern:*

Be it known that I, THOMAS C. COYKENDALL, a resident of Rondout, Ulster county, State of New York, have invented certain new and useful Improvements in Ventilating Armatures, of which the following is a specification.

My invention relates to dynamo electric machines and motors and has for its object to produce a device which will thoroughly ventilate the armature by currents of air in order to carry off the heat generated by the passage through the coils thereof of large currents of electricity. I obtain this object by the mechanism illustrated in the accompanying drawings, in which—

Figure 1:
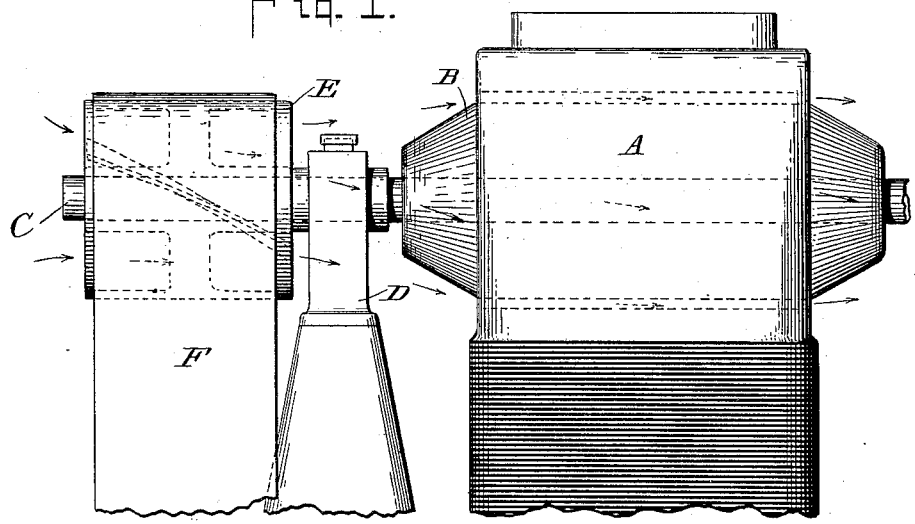
Figure 2:
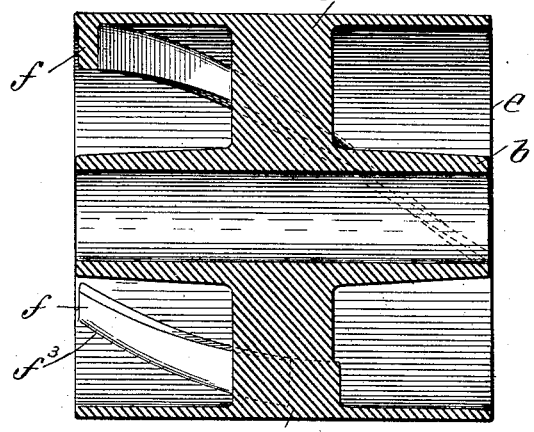

Figure 1 is an elevation of a dynamo electric machine or motor showing my invention applied thereto. Fig. 2 is a transverse vertical section through the pulley shown in Fig. 1. Fig. 3 is a section of a preferred form of my invention hereinafter described. Fig. 4 is a detail perspective view of a part of Fig. 3, as will be more fully set forth. Figs. 5 and 6 are diagrams showing how the form of the face of the fans, hereinafter described, may preferably be determined.

A is the field magnet of a dynamo electric machine or motor, and B is the armature thereof.

C is the shaft on which the armature is mounted, and D is the bearing of the machine.

On the shaft C is mounted a pulley E of suitable form and construction around which passes a belt F serving to drive the dynamo, or to take the power from the motor, as the case may be. On the inner face of the rim $e$ of the pulley I mount fans consisting of blades $ff$, extending through the space between the radial arms $g$ which connect the rim with the hub $b$ of the pulley, the line of junction of the edge $f^3$ of each fan and the inner face of the rim of the pulley, being a spiral. These fans serve, when the pulley is rotated, to set up a circulation of air through the pulley, which may be directed by a lip or funnel such as $h$ (see Fig. 3) onto the armature of the machine as shown by the arrows, Fig. 1. This lip also serves as a guard to protect the workman's hands from being struck by the fans when he is in the act of oiling the bearings. I may mount the fans on the hub of the pulley and make them of any desired shape, length or height. My preferred form is illustrated in Figs. 3 and 4. In these figures the line of junction $f^3$ of each blade and the inner face of the rim of the pulley is a spiral as in the previous figures, but instead of making each blade radial to the pulley throughout as in Figs. 1 and 2, only one edge $f'$ of the blade $f$ is made radial. From this radial edge the blade is inclined to the radius, the inclination gradually increasing and becoming greatest at the edge $f^2$. The line of the edge $f^4$ of each blade (in Figs. 3 and 4) is also a spiral, but instead of being parallel with the edge $f^3$ departs gradually therefrom, the departure being greatest at $f^2$ and least or zero at $f'$. It will be obvious that when the pulley is revolved in the direction of the arrow (see Fig. 4) a current of air will flow along the blades from $f'$ to $f^2$. Centrifugal force will tend to bank this air within the angle $f^5$ formed by the blade and the inner face of the rim of the pulley. As the air flows along this angle its speed gradually increases, and, as the inclination of the fan also gradually increases, the air will be thrown toward the axis of the pulley, thus overcoming the centrifugal force, and discharging the air in a compact cylindrical stream. The lip $f$ serves to direct the stream of air.

In Figs. 5 and 6 I have shown diagrammatically a practical method of determining the inclination of the blades in Figs. 3 and 4 at every point in their lengths. We will suppose a series of equal similar right-angled triangles $i$ to be cut out of sheets of thin material and superposed as shown in full lines in Figs. 5 and 6.

We will now suppose the pile of triangles to be clamped tightly by their edges 2 so as to keep these edges all in line and prevent motion one on the other. If, now, the pile be bent as shown in dotted lines in Fig. 5 on a radius equal to the pulley radius, the edges 2 will remain all in the same plane and the angles 4 with the edges 3 (hypotenuse) will be displaced, and will lie in a warped surface as shown. (The edges 1 will, however, remain all in the same plane.) Proceeding along the hypotenuse 3 from the angle 5 to the angle 4, the triangles will slightly overlap, the overlapping being greatest at the angle 4, and least or zero at the angle 5. If, now, the pile thus bent be laid on the inner face of the rim of the pulley with the side 2 parallel to the axis of the pulley, the overlapping edges of the hypotenuse form a templet to plot the curve and inclination of a fan blade. The fan blade thus plotted and made by the pattern-maker will serve as a pattern for the remaining fan blades.

Instead of forcing the current of air through the machine, the direction of the fan blades may be changed and the current drawn through from the machine to the pulley; a suitable housing between the pulley and the machine may be used in either case instead of the lip $h$.

I have shown the blades $f f$ as extending spirally around the inner part of the rim of the pulley, but it is obvious that they may be otherwise disposed around the shaft.

I do not limit myself to the precise construction, arrangement or disposition of the fans as it is obvious that the details may be greatly varied without departing from the spirit of my invention.

What I claim, and desire to secure by Letters Patent, is—

1. The combination with a dynamo electric machine or motor, of a pulley having a hub $b$, radial arms $g$, air passages between the radial arms, and fan blades mounted upon the pulley between the radial arms, substantially as described.

2. The combination with a dynamo electric machine or motor, of a pulley having arms $g$ and fan-blades mounted on the inner face of the rim between the arms thereof, substantially as described.

3. The combination with a dynamo electric machine or motor, of a pulley having fan blades mounted on the inner face of the rim between the arms thereof, and extending spirally around the axis of the pulley, substantially as described.

4. The combination with a dynamo electric machine or motor of a pulley carrying fans consisting of blades extending spirally around the axis thereof, having one edge radial to the axis of the pulley shaft and the opposite edge inclined to such radius, substantially as described.

5. The combination with a dynamo electric machine or motor of a pulley carrying fans consisting of blades extending spirally around the axis thereof, having one edge radial to the axis of the pulley shaft and the opposite edge inclined to such radius, the blades having a gradual inclination from the radial edge to the inclined edge, substantially as described.

THOMAS C. COYKENDALL.

Witnesses:
GEO. E. MORSE,
JAMES L. SUYDAM.